(12) United States Patent
Burnham et al.

(10) Patent No.: US 6,616,434 B1
(45) Date of Patent: Sep. 9, 2003

(54) BLOWING AGENT METERING SYSTEM

(75) Inventors: Theodore A. Burnham, Winchester, MA (US); Jeffrey L. Ng, Natick, MA (US)

(73) Assignee: Trexel, Inc., Woburn, MA (US)

( * ) Notice: Subject to any disclaimer, the term of this patent is extended or adjusted under 35 U.S.C. 154(b) by 0 days.

(21) Appl. No.: 09/636,349

(22) Filed: Aug. 10, 2000

(51) Int. Cl.⁷ .................. B29C 44/38; B29C 44/46; B29C 44/60
(52) U.S. Cl. .................. 425/4 R; 425/4 C; 425/135; 425/145; 425/532
(58) Field of Search .................. 264/40.1, 51; 425/4 C, 425/817 R, 135, 145, 4 R, 532

(56) References Cited

U.S. PATENT DOCUMENTS

| | | |
|---|---|---|
| 3,686,388 A | 8/1972 | Beckmann et al. |
| 3,697,204 A | 10/1972 | Kyritsis et al. |
| 3,793,416 A | 2/1974 | Finkmann et al. |
| 3,856,442 A * | 12/1974 | Gallagher et al. .......... 425/4 C |
| 4,043,715 A | 8/1977 | Hendry |
| 4,211,523 A | 7/1980 | Hunnerberg |
| 4,344,710 A * | 8/1982 | Johnson et al. .............. 366/76 |
| 4,381,272 A | 4/1983 | Ehritt |
| 4,424,287 A * | 1/1984 | Johnson et al. .............. 521/74 |
| 4,470,938 A | 9/1984 | Johnson |
| 4,473,665 A | 9/1984 | Martini-Vvedensky et al. |
| 4,783,292 A | 11/1988 | Rogers |
| 5,047,183 A | 9/1991 | Eckardt et al. |
| 5,098,267 A * | 3/1992 | Cheng .................. 425/4 R |
| 5,158,986 A | 10/1992 | Cha et al. |
| 5,160,674 A | 11/1992 | Colton et al. |
| 5,328,651 A * | 7/1994 | Gallagher et al. ......... 264/46.1 |
| 5,334,356 A | 8/1994 | Baldwin et al. |
| 5,866,053 A | 2/1999 | Park et al. |
| 6,005,013 A * | 12/1999 | Suh et al. .................. 521/79 |
| 6,169,122 B1 | 1/2001 | Blizard et al. |
| 6,231,942 B1 | 5/2001 | Blizard et al. |
| 6,235,380 B1 | 5/2001 | Tupil et al. |
| 6,284,810 B1 | 9/2001 | Burnham et al. |
| 6,322,347 B1 | 11/2001 | Xu |
| 6,376,059 B1 | 4/2002 | Anderson et al. |
| 6,451,230 B1 | 9/2002 | Eckardt et al. |

FOREIGN PATENT DOCUMENTS

| | | |
|---|---|---|
| EP | 0 843 246 A2 | 11/1997 |
| WO | WO 9808667 | 3/1998 |
| WO | WO 9831521 | 7/1998 |

* cited by examiner

Primary Examiner—Allan R. Kuhns
(74) Attorney, Agent, or Firm—Wolf, Greenfield & Sacks, P.C.

(57) ABSTRACT

The invention provides a blowing agent metering system and method for use in polymeric foam processing. The system may be used to control the rate of introduction of blowing agent into polymeric material in a processing apparatus to form a mixture having the desired blowing agent weight percentage. The metering system includes a restriction orifice which is positioned in a pathway between a blowing agent source and a blowing agent port within a foam processing apparatus. The metering system measures the pressure differential as blowing agent flows across the restriction orifice from the source to the port and may also measure the temperature of the blowing agent at one or more locations. Using a pre-determined relationship between the flow rate, the orifice dimensions (e.g., length, diameter) and the measured variables (e.g., pressure differential, temperature), a controller of the system adjusts the pressure upstream of the restriction orifice in response to inputs of the measured variables to maintain a pressure differential across the orifice that provides the desired blowing agent flow rate.

16 Claims, 3 Drawing Sheets

BLOWING AGENT METERING SYSTEM

FIELD OF THE INVENTION

The present invention relates generally to polymer foam processing and, more particularly, to a system and method of metering blowing agent in a polymeric foam process.

BACKGROUND OF THE INVENTION

Polymeric foams include a plurality of voids, also called cells, in a polymer matrix. A number of techniques for processing polymeric material utilize an extruder which plasticates polymeric material by the rotation of a screw within a barrel. Certain polymeric foam processes involve injecting a physical blowing agent into molten polymeric material, for example, through a blowing agent port formed within the barrel to form a mixture of polymeric material and blowing agent. The mixture may be processed (e.g., extruded, blow molded or injection molded) to form the desired polymeric foam article.

Blowing agent injection systems include a blowing agent source which may be fluidly connected to the blowing agent port. Such injection systems may also include one or more valves to control blowing agent flow, pumps to pressurize the blowing agent, and other devices such as pressure regulators. In some cases, the injection system may also function as a metering system that controls the rate of introduction of blowing agent into the polymeric material in the extruder barrel. Such metering systems may be used, in particular, in processes that require relatively precise control over blowing agent introduction, such as certain processes for producing microcellular materials. Microcellular materials are polymeric foams that have small cell sizes and large cell densities.

Some conventional metering systems include a flow meter, a metering valve, and a controller. During operation, the controller adjusts the metering valve to provide a desired flow rate in response to inputs from the meter and, in some cases, inputs from an operator. Such metering systems are generally expensive, in part, due to the cost of flow meters. The accuracy of such metering systems may also be compromised by fluctuation in pressures within the extruder.

Accordingly, there is a need for blowing agent metering systems that accurately meter blowing agent and are relatively inexpensive.

SUMMARY OF THE INVENTION

The invention provides a blowing agent metering system and method for use in polymeric foam processing. The system may be used to control the rate of introduction of blowing agent into polymeric material in a processing apparatus to form a mixture having the desired blowing agent weight percentage. The metering system includes a restriction orifice which is positioned in a pathway between a blowing agent source and a blowing agent port within a foam processing apparatus. The metering system measures the pressure differential as blowing agent flows across the restriction orifice from the source to the port and may also measure the temperature of the blowing agent at one or more locations. Using a pre-determined relationship between the flow rate, the orifice dimensions (e.g., length, diameter) and the measured variables (e.g., pressure differential, temperature), a controller of the system adjusts the pressure upstream of the restriction orifice in response to inputs of the measured variables to maintain a pressure differential across the orifice that provides the desired blowing agent flow rate.

In one aspect, the invention provides a blowing agent metering system. The metering system includes a blowing agent delivery conduit connectable to a source of blowing agent and to a blowing agent port formed within a polymer processing apparatus and able to deliver blowing agent from the source to polymeric material within the processing apparatus. The conduit includes a section defining a restriction orifice. The metering system further includes a pressure differential measuring device constructed and arranged to measure the blowing agent pressure differential across the restriction orifice. The metering system further includes an upstream pressure regulating device associated with the conduit upstream of the restriction orifice.

In another aspect, the invention provides a polymer processing system. The polymer processing system includes an extruder including a polymer processing screw constructed and arranged to rotate within a barrel to convey polymeric material in a polymer processing space defined between the screw and the barrel in a downstream direction. The barrel has a blowing agent port formed therein. The system further includes a blowing agent delivery system including a conduit connectable to a source of blowing agent and to the blowing agent port. The conduit includes a section defining a restriction orifice. The blowing agent delivery system includes a pressure differential measuring device constructed and arranged to measure the blowing agent pressure differential across the restriction orifice, and an upstream pressure regulating device associated with the conduit upstream of the restriction orifice.

In another aspect, the invention provides a method of metering blowing agent. The method includes metering introduction of blowing agent into polymeric material in a polymer processing apparatus by regulating pressure of blowing agent upstream of an orifice through which blowing agent passes in response to inputs of the blowing agent pressure differential across the orifice.

Among other advantages, the blowing agent metering system may be used to accurately meter the flow of blowing agent into polymeric material over a wide range of blowing agent flow rates. The metering system may regulate in real time the pressure differential across the orifice to provide the desired flow rate so that system can account for pressure fluctuations that may exist in the extruder throughout the process. Furthermore, the blowing agent metering system has a simple design and may be manufactured relatively inexpensively. Also, the blowing agent delivery system may be used with any polymer processing system including extrusion, injection molding and blow molding systems.

Other advantages, aspects, and features of the invention will become apparent from the following detailed description of the invention when considered in conjunction with the accompanying drawings.

DETAILED DESCRIPTION

The invention provides a blowing agent metering system for introducing blowing agent into polymeric material in a polymer processing apparatus. The flow rate of blowing agent through the metering system and into the polymeric material is controlled by adjusting the pressure differential (i.e., pressure drop) across a restriction orifice to a desired value, for example, by regulating the pressure upstream of the orifice. As described further below, the desired pressure differential may be calculated from a pre-determined relationship between pressure differential, flow rate, orifice dimensions, and potentially other variables measured by the system (e.g., temperature).

Figure 1:
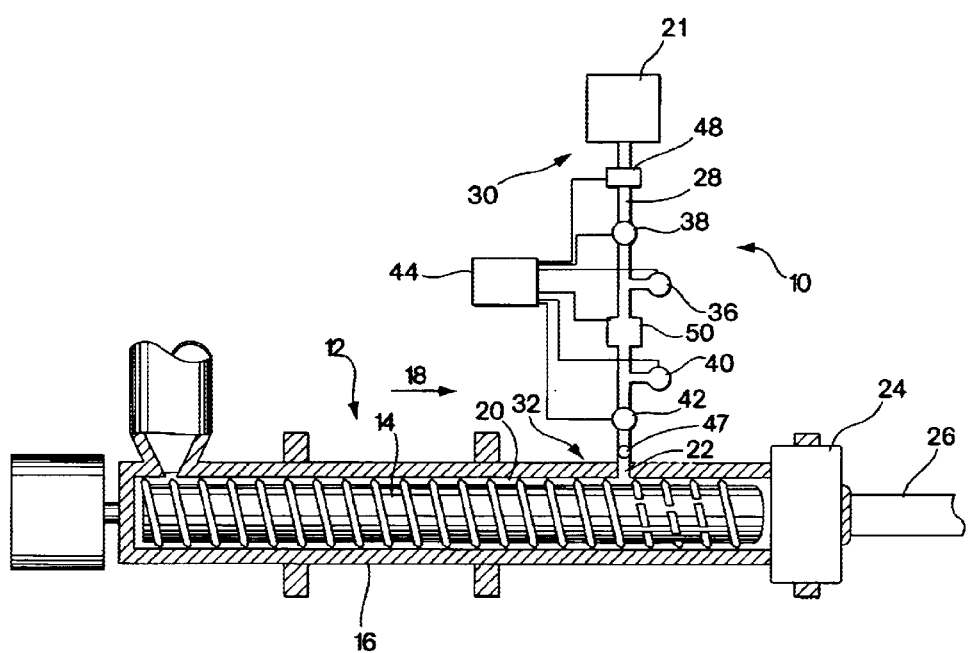
FIG. 1 schematically illustrates a blowing agent metering system according to one embodiment of the present invention used to meter blowing agent introduction into an extrusion apparatus.
Figure 2:
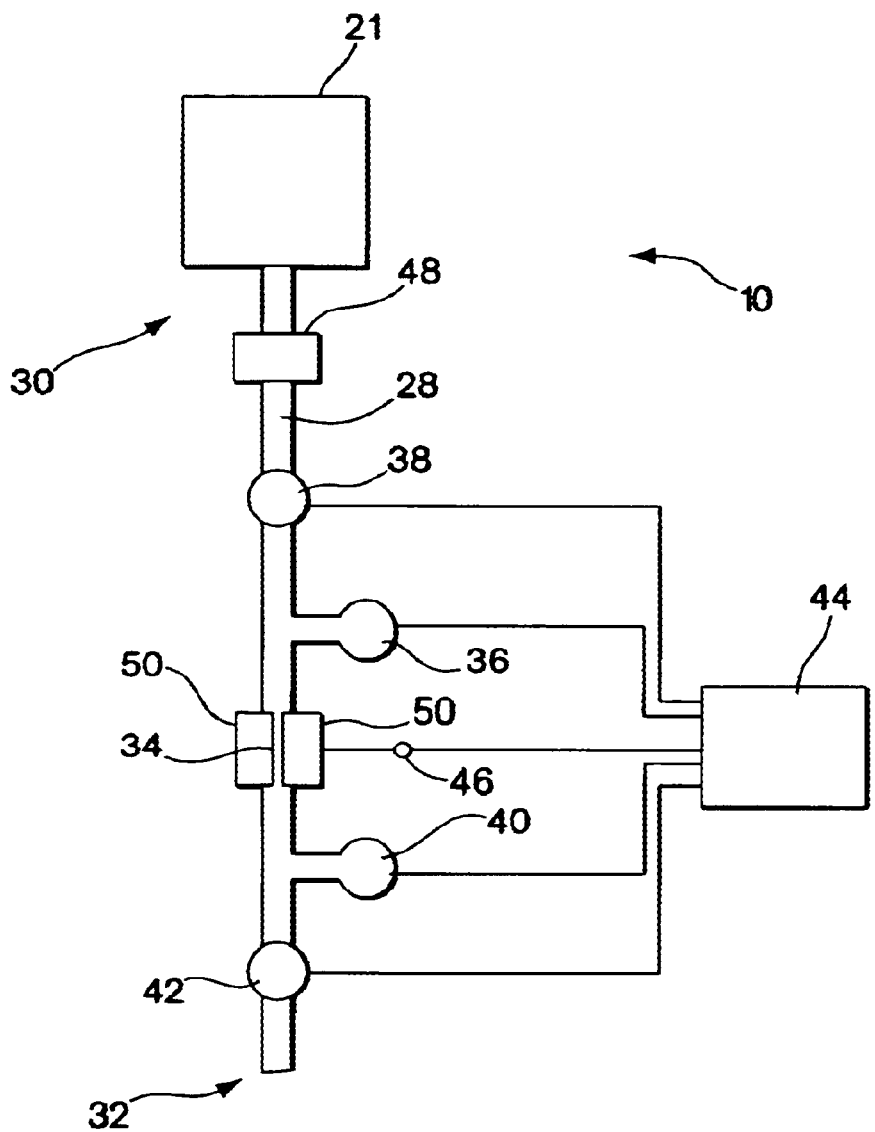
FIG. 2 schematically illustrates the blowing agent metering system of FIG. 1.

Referring to FIGS. 1–2, a blowing agent metering system 10 is used to deliver blowing agent to an extruder 12. Extruder 12 includes a polymer processing screw 14 that is rotatable within a barrel 16 of the extruder to convey polymeric material in a downstream direction 18 within a polymer processing space 20 defined between the screw and the barrel. Blowing agent from a source 21 is introduced into the polymeric material by the blowing agent metering system through a blowing agent port 22 formed within the barrel to form a mixture of blowing agent and polymeric material within the polymer processing space. As described further below, the metering system controls the rate of blowing agent introduction to provide a mixture having the desired weight percentage of blowing agent. The polymeric material and blowing agent mixture is extruded through a die 24 fixed to the downstream end of the barrel to form a polymeric foam extrudate 26.

Blowing agent metering system 10 includes an upstream end 30 connectable to source 21 and a downstream end 32 connectable to blowing agent port 22. Conduit 28 extends from upstream end 30 to downstream end 32 to connect various components of the metering system and to provide a pathway from the source to the blowing agent port. The blowing agent metering system includes a restriction orifice 34 through which blowing agent passes when flowing from the source to the blowing agent port. Upstream of restriction orifice 34, the blowing agent metering system includes an upstream pressure measuring device 36 and an upstream pressure regulator 38. Downstream of orifice 34, the blowing agent metering system includes a downstream pressure measuring device 40 and, optionally, a downstream pressure regulator 42. A controller 44 of the blowing agent metering system is operably connected to the measuring devices and regulators, so that the controller may receive inputs from the measuring devices and can provide outputs to control the regulator(s).

In some embodiments and as illustrated, blowing agent metering system 10 may include one or more temperature measuring device 46. Temperature measuring device 46 may be provided at one or more of the following locations: at orifice 34, upstream of the orifice, or downstream of the orifice. The temperature measuring device(s) may also be operatively connected to controller 44, so that the controller is responsive to inputs from the temperature measuring devices.

In some cases, the blowing agent metering system may include a temperature controlling device (not illustrated). Such temperature controlling devices may be employed to heat or cool the blowing agent to a desired temperature. The temperature controlling devices may be located at one or more of the following locations: at orifice 34, upstream of the orifice, or downstream of the orifice. Temperature controlling devices are not required in many embodiments of the invention.

Blowing agent delivery system 10 utilizes a relationship between the pressure differential across an orifice, the dimensions of the orifice and the flow rate of blowing agent. Such a relationship may be pre-determined for a given orifice using a calibration procedure. The calibration procedure for an orifice involves measuring the flow rate through the orifice at a number of different pressure and temperature conditions. The dependency of flow rate on the orifice dimensions and other measured variables may be determined, for example, using regression analysis as known to those of ordinary skill in the art. The measured variables may include pressure differential across the orifice, upstream pressure, downstream pressure, and temperature of the blowing agent at one or more locations. The relationship may be used by controller 44 to determine how to regulate the pressure upstream of orifice 34 to provide a desired blowing agent flow rate in response to inputs from the measuring devices (e.g., pressure differential across orifice, temperature) and manual inputs (e.g., dimensions of orifice).

During an illustrative use of metering system 10, source 21 provides blowing agent to the metering system. As blowing agent flows through conduit 28, the upstream pressure is measured by device 36, the downstream pressure is measured by device 40, and the temperature of blowing agent at orifice 34 is measured (optionally) by device 46. The pressure and temperature measuring devices send input signals to controller 44. Controller 44 processes the input signals and compares the measured pressure differential across orifice 34 to a desired pressure differential corresponding to the selected flow rate as calculated by the relationship determined during calibration. Controller 44 sends an appropriate output signal to the upstream pressure regulator to adjust the upstream pressure of orifice 34, if necessary, to maintain the desired pressure differential. The flow rate, thus, of blowing agent into polymeric material within processing space 20 may be maintained at a selected value to create a mixture of polymeric material and blowing agent having a chosen percentage of blowing agent. Even when the pressure downstream of orifice 34 changes, for example in response to pressure fluctuations within the polymeric material in the extruder, the metering system may respond by adjusting the upstream pressure accordingly to provide the selected flow rate.

Though blowing agent metering system 10 is illustrated as being used in conjunction with an extrusion apparatus, it should be understood that the blowing agent metering system may be used in conjunction with any polymer processing apparatus into which blowing agent is introduced, such as injection molding apparati and blow molding apparati. An example of suitable extrusion apparati has been described, for example, in International Publication No. WO 98/08667 and in corresponding U.S. patent application Ser. No. 09/258,625 (Burnham et al.) which are each incorporated herein by reference. Examples of suitable injection molding apparati have been described, for example, in International Publication No. WO 98/31521 (Pierick et al.) which is incorporated herein by reference. An example of suitable blow molding apparati have been described, for example, in International Publication No. WO 99/32544 (Anderson et al.) which is incorporated herein by reference.

The blowing agent metering system may be used with the polymer processing apparati to produce any type of polymeric foam material. In some embodiments, the blowing agent metering system may be used to introduce blowing agent into a polymer processing system that produces microcellular materials. In some embodiments, the microcellular materials produced may have an average cell size of less than 100 microns; in some embodiments, an average cell size of less than 50 microns; in some embodiments, an average cell size of less than 25 microns; in some embodiments, an average cell size of less than 10 microns; and in some embodiments, an average cell size less than 1 micron.

Blowing agent metering system 10 may be used to introduce blowing agent into polymeric material within the extruder over a wide range of different flow rates as required by the particular process. For example, the blowing agent mass flow rate is generally between 0.001 lbs/hr and about 100 lbs/hr, in some cases between about 0.002 lbs/hr and 60 lbs/hr, and in some cases between about 0.02 lbs/hr and about 10 lbs/hr. The blowing agent is typically introduced into the polymeric material so as to provide the mixture with a desired blowing agent level. The desired blowing agent level depends upon the particular process and is generally less than about 15% by weight of polymeric material and blowing agent. In many embodiments, the blowing agent level is less than about 8%, in others less than about 5%, in others less than about 3%, in others less than about 1%, and still others less than about 0.1%, or even lower by weight of polymeric material and blowing agent mixture.

Blowing agent source 21 may supply to metering system 10 any type of physical blowing agent known to those of ordinary skill in the art including nitrogen, carbon dioxide, hydrocarbons, chlorofluorocarbons, noble gases and the like or mixtures thereof. The blowing agent may be supplied in any flowable physical state such as a gas, a liquid, or a supercritical fluid. According to one preferred embodiment, source 21 provides carbon dioxide as a blowing agent. In another preferred embodiment, source 21 provides nitrogen as a blowing agent. In certain embodiments, solely carbon dioxide or nitrogen is used. Blowing agents that are in the supercritical fluid state after injection into the extruder, (optionally, before injection as well) and in particular supercritical carbon dioxide and supercritical nitrogen, are preferred in certain embodiments.

Conduit 28 of the blowing agent metering system may be any of the type known in the art suitable for transporting blowing agent. For example, conduit 28 may be a tube made of a suitable material for transporting pressurized gas, liquefied gas, and/or supercritical fluid, such as a metal tube. In some cases, the conduit may be a stainless steel metal tube. In other embodiments, the conduit may be defined by passageways within a block of material, such as drill passageways within a block of metal, for example, stainless steel. The conduit typically has a cross-sectional diameter in the range of from about 1 cm to about 0.1 mm. However, it is to be understood, that the length and configuration of conduit 28 is not constrained and generally depends upon factors such as available manufacturing space, and the layout of the polymer processing and blowing agent metering system. In some cases, it may be desirable to minimize the length of conduit 28, for example, to minimize pressure losses of blowing agent passing therethrough. In some cases, conduit 28 may have one or more branches, for example, to facilitate connection to the various components.

In some embodiments, such as when source 21 does not supply blowing agent at a sufficiently high pressure, a pump 48 may be connected to an outlet of the source to increase and/or maintain the pressure of blowing agent in the metering system 10. Generally, the blowing agent pressure within the metering system is maintained at least above 1000 psi, and in many cases at least above 2000 psi. The maximum blowing agent pressure within the metering system is generally less than 10,000 psi and, in some cases, less than 7000 psi.

The temperature and pressure measuring devices and the pressure regulating devices used in blowing agent metering system 10 may be any of the type known in the art. Suitable pressure measuring devices, for example, include pressure transducers. One commercially available pressure transducer that may be used in metering system 10 is Model Number PX305-10KGI manufactured by OMEGA Engineering, Inc., Stamford, Conn. Suitable temperature measuring devices include, for example, thermocouples. One commercially available thermocouple that may be used in metering system 10 is Model number GKMQSS-062G-6 manufactured by OMEGA Engineering, Inc., Stamford, Conn. Suitable pressure regulators may control the pressure, in some embodiments, between about 500 psi and about 7000 psi. The pressure regulator may include a restriction which may be varied by moving an actuator, for example, in response to output signals from the controller. One commercially available pressure regulator that may be used in metering system 10 is Model Number ER 3000 manufactured by Tescom Corporation, Elk River, Minn.

Upstream pressure measurement device 36 and pressure regulator 38 may be positioned at any point upstream of orifice 34 and downstream of source 21, though generally the pressure measuring device is positioned between the regulator and the orifice. In some embodiments, it may be preferably to position pressure measuring device 36 and regulator 38 proximate to orifice 34 and/or proximate to one another to provide an accurate measurement of the pressure upstream of the orifice by minimizing pressure losses through conduit 28 therebetween. In some embodiments, the distance between pressure measuring device 36 and orifice 34 and/or the distance between measuring device 36 and regulator 38 may be between about 0.1 inches and about 12.0 inches.

Downstream pressure measurement device 40 may be positioned at any point downstream of orifice 34 and upstream of blowing agent port 22. In some embodiments, it may be preferably to position pressure measuring device 40 proximate to orifice 34 to provide an accurate measurement of the pressure at upstream the orifice by minimizing pressure losses through conduit 28 therebetween. In some embodiments, the distance between pressure measuring device 40 and orifice 34 may be between about 0.1 inches and about 12.0 inches.

In embodiments which include a downstream pressure regulator 42, the pressure regulator may be located at any point between orifice 34 and port 22, though generally is downstream of measuring device 40. In some embodiments, the distance between measuring device 40 and regulator 42 may be between about 0.1 inches and about 12.0 inches. Metering system 10 includes downstream pressure regulator 42 in cases when it is desirable to fix the pressure downstream of orifice 34, for example, to isolate metering system 10 from the pressure in the extruder. However it is to be understood that downstream pressure regulator 42 is optional and that metering system 10 may accurately meter blowing agent without the downstream regulator, even when pressure differences in the extruder exist as described above.

Temperature measuring device 46 may be located, when provided, at any point upstream or downstream of orifice 34. In some of these embodiments, it may be preferable to locate the temperature measuring devices 46 proximate to the upstream end of the orifice and/or the downstream end of the orifice. In some cases, temperature measuring device 46 may also be at orifice 34. The temperature measuring device may directly measure the temperature of the blowing agent but, in some cases, may measure a wall (e.g., orifice wall) temperature which is indicative of the blowing agent temperature. When provided, the temperature measuring devices provide inputs to controller 44 which, in some embodiments, may be used to improve metering accuracy.

In some embodiments, the downstream end of blowing agent metering system may be connected to a shut-off valve 47 which may permit or prevent the introduction of blowing agent into the polymeric material within extruder 12. Shut-off valve 47 is in an open position to permit the flow of blowing agent into the polymeric material in the extruder and in a closed position to prevent the flow of blowing agent therepast. The shut-off valve may be any of the type known in the art such as solenoid, spool, or other equivalent types of valves. In some embodiments, it may be preferable to position the shut-off valve close to blowing agent port 22. In some cases, the shut-off valve may be positioned "essentially adjacent" to the blowing agent port which means positioning the valve as close as possible to the polymer flowing within the extruder without compromising the ability of the valve to function. Suitable shut-off valves including shut-off valves positioned essentially adjacent to the blowing agent port have been described in co-pending and commonly-owned U.S. application Ser. No. 60/187,530, filed on Mar. 7, 2000 (Levesque et al.).

Certain embodiments of metering system 10 may not include a separate shut-off valve that controls the introduction of blowing agent into the polymeric material. In these embodiments, metering system 10 may prevent or permit the flow of blowing agent into the extruder by controlling the blowing agent pressure via upstream regulator 38 and downstream regulator 42. That is, the metering system may control the pressure of blowing agent at the blowing agent port to be lower than the pressure in the extruder to prevent introduction, or higher than the pressure in the extruder to permit introduction.

Controller 44 may be any of the type known in the art such as a computer. As described above, the controller is capable of receiving input signals from the pressure and temperature measuring devices and sending appropriate output signals to upstream pressure regulator 38. In some embodiments, input signals may be received by controller 44 continuously and output signals may be sent by the controller continuously and simultaneously (e.g., within real time). In some cases, the input signals and the output signals are respectively received and sent at a rate of at least 1 Hz; in other cases, at a rate of at least about 5 Hz; in other cases, at a rate of least about 10 Hz; in other cases, at a rate of least about 20 Hz. In other cases, the input signals and the output signals may be respectively received and sent continuously. The rate at which the input signals are received need not match the rate at which the output signals are sent. For example, the input signals may be received continuously, while the output signals may be provided at an interval.

Figure 3:
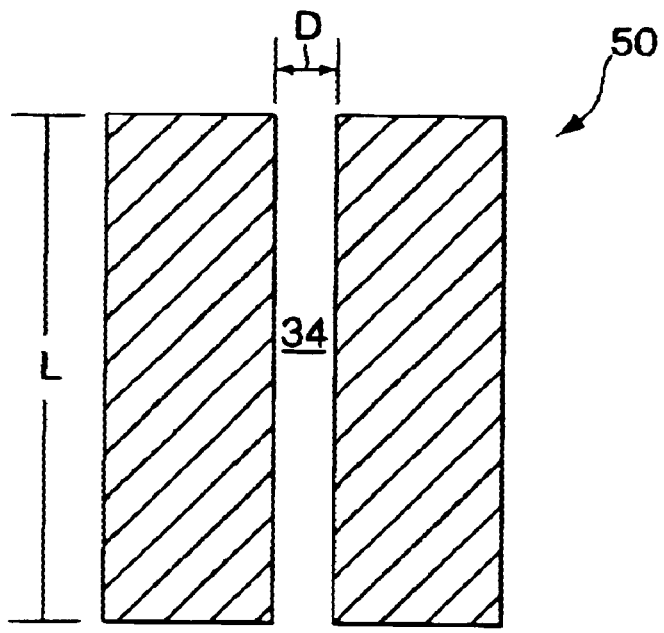
FIG. 3 schematically illustrates a fixed orifice of the blowing agent metering system according to one embodiment of the present invention.

Orifice 34 may be provided in an orifice block 50 as shown in FIG. 3. In some embodiments, the dimensions of orifice 34 are fixed, though in other cases the dimensions may change during the process. In some embodiments, orifice block 50 may be interchangeable with another orifice block to provide the metering system with the capability of utilizing an orifice with different dimensions. Generally, orifice 34 is a cylindrical bore having a constant cross-section for its entire length. Cylindrical bores may be utilized because they are easily machined, though orifices having other geometries may also be used. The specific dimensions of orifice 34 is dependent upon the metering requirements of the particular process. In some embodiments, orifice 34 may have a length L of between about 0.010 inches and about 0.040 inches, a diameter D of between about 0.001 inches and about 0.01 inches, and a L/D (length/diameter) ratio of between about 1:1 and about 6:1.

It should be understood that other types of restriction orifices 34 may be used in the metering system other than the illustrative embodiment. In some embodiments, restriction orifice may be a porous material such as a porous metal. In some cases, more than one restriction orifice may be used. When multiple restriction orifices are used, the orifices may be arranged in parallel, in series, or in combinations of series and parallel.

The function and advantage of these and other embodiments of the present invention will be more fully understood from the example below. The following example is intended to illustrate the benefits of the present invention, but does not exemplify the full scope of the invention.

Example

Blowing Agent Metering System

A blowing agent metering system was assembled and connected at its upstream end to a Nitrogen dewar (Middlesex Welding Supply Company, Middlesex, Mass.). The connections between the metering system to the Nitrogen dewar and between various components of the system were made with standard stainless steel tubing having an outer diameter of ¼ inch. Downstream of the Nitrogen dewar, the system included a pump (5G-TS 1475, Hydraulics International, Chatsworth, Calif.), connected to a pressure regulator (ER 3000, Tescom Corporation, Elk River, Minn.), connected to thermocouple (GXMQSS-062G-6, OMEGA Engineering, Inc., Stamford, Conn.), connected to a pressure transducer (PX305-10KGI, OMEGA Engineering, Inc., Stamford, Conn.).

The pressure transducer was connected to an interchangeable orifice block. Three different orifice blocks were respectively utilized in the metering system. The first orifice block was machined out of ruby and included a length of 0.002 inches and a diameter of 0.004 inches. The second orifice block was machined out of 316 stainless steel and had a length of 0.003 inches and a diameter of 0.006 inches. The third orifice block was machined out of 316 stainless steel and had a length of 0.004 inches and a diameter of 0.008 inches. A thermocouple (CO1-K, OMEGA Engineering, Inc., Stamford, Conn.) was connected to the orifice block.

Downstream of the orifice block, the system included a pressure transducer (PX305-10KGI, OMEGA Engineering, Inc., Stamford, Conn.), connected to thermocouple (GXMQSS-062G-6, OMEGA Engineering, Inc., Stamford, Conn.), connected to a pressure regulator (26-176-124, Tescom Corporation, Elk River, Minn.), connected to a shut-off valve (10-11AF4, High Pressure Equipment Company, Erie, Pa.).

The metering system included an IBM compatible PC which was connected to the pressure and temperature measuring device so as to receive inputs and was connected to the pressure regulating devices so as to send outputs.

The metering system was suitable for metering blowing agent into any polymeric processing system including extrusion, injection molding and blow molding systems.

Those skilled in the art would readily appreciate that all parameters listed herein are meant to be exemplary and that the actual parameters would depend upon the specific application for which the blowing agent metering systems of the invention are used. It is, therefore, to be understood that the foregoing embodiments are presented by way of example only and that, within the scope of the appended claims and equivalents thereto, the invention may be practiced otherwise than as specifically described.

What is claimed:

1. A blowing agent metering system comprising:

a blowing agent delivery conduit connectable to a source of blowing agent and to a blowing agent port formed within a polymer processing apparatus, the conduit able to deliver blowing agent from the source to polymeric material within the polymer processing apparatus, the conduit including a section defining a restriction orifice;

a pressure differential measuring device constructed and arranged to measure the blowing agent pressure differential across the restriction orifice;

an upstream pressure regulating device associated with the conduit upstream of the restriction orifice;

a downstream pressure regulating device associated with the conduit downstream of the restriction orifice;

a temperature measuring device associated with the conduit or the restriction orifice; and a controller able to adjust at least one of the upstream pressure regulating device and the downstream pressure regulating device in response to inputs from the pressure differential measuring device and the temperature measuring device.

2. The blowing agent metering system of claim 1, wherein the pressure differential measuring device comprises an upstream pressure measuring device associated with the conduit positioned upstream of the restriction orifice and a downstream pressure measuring device associated with the conduit positioned downstream of the restriction orifice.

3. The blowing agent metering system of claim 1, wherein the controller is designed to adjust at least one of the upstream pressure regulating device and the downstream pressure regulating device to provide a pressure differential corresponding to a selected flow rate.

4. The blowing agent metering system of claim 1, wherein the restriction orifice has fixed dimensions.

5. The blowing agent metering system of claim 1, wherein the restriction orifice is defined within an interchangeable block.

6. The blowing agent metering system of claim 1, further comprising a shut-off valve positioned downstream of the orifice moveable between an open configuration to permit the flow of blowing agent therepast and a closed configuration to prevent the flow of blowing agent therepast.

7. The blowing agent metering system of claim 1, further comprising a pump capable of increasing the pressure of blowing agent within the blowing agent metering system.

8. The blowing agent metering system of claim 1, wherein the metering system is capable of metering the mass flow of blowing agent between about 0.001 lbs/hr and about 100 lbs/hr.

9. The blowing agent metering system of claim 1, wherein the metering system is capable of metering the mass flow of blowing agent between about 0.02 lbs/hr and about 10 lbs/hr.

10. A polymer processing system comprising:

an extruder including a polymer processing screw constructed and arranged to rotate within a barrel to convey polymeric material in a polymer processing space defined between the screw and the barrel in a downstream direction, the barrel having a blowing agent port formed therein; and a blowing agent delivery system including a conduit connectable to a source of blowing agent and to the blowing agent port, the conduit including a section defining a restriction orifice, the blowing agent delivery system including a pressure differential measuring device constructed and arranged to measure the blowing agent pressure differential across the restriction orifice, a downstream pressure regulating device associated with the conduit downstream of the restriction orifice, an upstream pressure regulating device associated with the conduit upstream of the restriction orifice, a temperature measuring device associated with the conduit or the restriction orifice, and a controller able to adjust at least one of the upstream pressure regulating device and the downstream pressure regulating device in response to inputs from the pressure differential measuring device and the temperature measuring device.

11. The polymer processing system of claim 10, wherein the pressure differential measuring device comprises an upstream pressure measuring device associated with the conduit positioned upstream of the restriction orifice and a downstream pressure measuring device associated with the conduit downstream of the restriction orifice.

12. The polymer processing system of claim 10, wherein the blowing agent metering system is capable of permitting the flow of blowing agent into polymeric material within the extruder and preventing the flow of blowing agent into polymeric material within the extruder by adjusting the downstream pressure regulating device associated with the conduit downstream of the restriction orifice.

13. The polymer processing system of claim 10, further comprising an extrusion die attached to a downstream end of the extruder.

14. The polymer processing system of claim 10, further comprising a blow molding die and a blow mold associated with the blow molding die.

15. The polymer processing system of claim 10, further comprising a molding chamber fluidly connected to an outlet end of the extruder.

16. The polymer processing system of claim 10, wherein the polymer processing system is designed to form a microcellular material.

* * * * *